US009194767B2

(12) United States Patent
Tachibana et al.

(10) Patent No.: US 9,194,767 B2
(45) Date of Patent: Nov. 24, 2015

(54) RIM EXCHANGE DEVICE OF TIRE TESTING MACHINE

(71) Applicant: MITSUBISHI HEAVY INDUSTRIES MACHINERY TECHNOLOGY CORPORATION, Hiroshima-shi, Hiroshima (JP)

(72) Inventors: Makoto Tachibana, Hiroshima (JP); Jiro Agawa, Hiroshima (JP); Morihiro Imamura, Hiroshima (JP); Tatsuya Ueda, Hiroshima (JP); Yoshinori Miyamoto, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 94 days.

(21) Appl. No.: 13/983,759

(22) PCT Filed: Oct. 10, 2012

(86) PCT No.: PCT/JP2012/076207
§ 371 (c)(1),
(2) Date: Aug. 5, 2013

(87) PCT Pub. No.: WO2013/105318
PCT Pub. Date: Jul. 18, 2013

(65) Prior Publication Data
US 2014/0054365 A1    Feb. 27, 2014

(30) Foreign Application Priority Data

Jan. 12, 2012    (JP) ................................. 2012-004298

(51) Int. Cl.
*G06F 17/00*    (2006.01)
*G01M 17/02*    (2006.01)

(52) U.S. Cl.
CPC .................. *G01M 17/021* (2013.01)

(58) Field of Classification Search
CPC ................................................... B65H 2511/40
USPC .......................................................... 235/375
See application file for complete search history.

(56) References Cited

U.S. PATENT DOCUMENTS

| 6,237,402 B1 | 5/2001 | Reese |
| 2001/0032499 A1 | 10/2001 | Jenniges et al. |

(Continued)

FOREIGN PATENT DOCUMENTS

| JP | 03-047742 A | 2/1991 |
| JP | 03-110138 A | 5/1991 |

(Continued)

OTHER PUBLICATIONS

International Search Report and Written Opinion corresponding to PCT/JP2012/076207, dated Dec. 25, 2012.

(Continued)

*Primary Examiner* — Thien M Le
*Assistant Examiner* — Tae Kim
(74) *Attorney, Agent, or Firm* — Kanesaka, Berner & Partners LLP (57) ABSTRACT

Provided is a rim exchange apparatus of a tire testing machine having a simple and space-saving configuration and capable of rotating a turntable having a plurality of rim placing parts with no interference and appropriately identifying a plurality of rim assemblies set on the turntable. A turntable is installed to be rotated about a rotary shaft with respect to the support part, a plurality of rim placing parts on which a rim assembly is placed are provided to the turntable about the rotary shaft, and reading parts are attached to the support part at a lower side of the turntable. Then, the reading parts read rim identification information of the rim assembly placed on the rim placing parts through the turntable at a predetermined reading position. Accordingly, the identification information of the rim assembly can be appropriately read with no interference with rotation of the turntable.

3 Claims, 8 Drawing Sheets

(56) References Cited

U.S. PATENT DOCUMENTS

| | | |
|---|---|---|
| 2003/0116625 A1* | 6/2003 | Litwiller et al. ............ 235/444 |
| 2003/0150920 A1 | 8/2003 | Parks |
| 2003/0156009 A1 | 8/2003 | Boulot |
| 2005/0285440 A1* | 12/2005 | Bal .......................... 301/63.101 |

FOREIGN PATENT DOCUMENTS

| | | | |
|---|---|---|---|
| JP | 03-231834 | A | 10/1991 |
| JP | 06-179303 | A | 6/1994 |
| JP | 2661753 | B | 10/1997 |
| JP | 10-034021 | A | 2/1998 |
| JP | 1034021 | A | 2/1998 |
| JP | 2001-241945 | A | 9/2001 |
| JP | 2004-504977 | A | 2/2004 |
| JP | 2004-514202 | A | 5/2004 |
| JP | 3672135 | B | 7/2005 |
| JP | 3672135 | B2 | 7/2005 |
| JP | 2006-105773 | A | 4/2006 |
| JP | 2006105773 | A | 4/2006 |
| JP | 2011-042185 | A | 3/2011 |
| JP | 2011-174839 | A | 9/2011 |

OTHER PUBLICATIONS

Office Action mailed Apr. 21, 2015, corresponding to Japanese patent application No. 2012-004298.

* cited by examiner

RIM EXCHANGE DEVICE OF TIRE TESTING MACHINE

TECHNICAL FIELD

The present invention relates to a rim exchange apparatus configured to exchange rims, in a tire testing machine such as a tire uniformity measuring apparatus measuring uniformity of tires, a tire balance measuring apparatus measuring the balance of tires, or the like.

This application is a National Phase of International Application Number PCT/JP2012/076207, filed Oct. 10, 2012 and claims priority from Japanese Patent Application No. 2012-004298, filed Jan. 12, 2012.

BACKGROUND ART

In a tire testing machine such as a tire uniformity measuring apparatus measuring uniformity of a tire, a tire balance measuring apparatus measuring the balance of tires, or the like, a testing rim assembly, which is divided in a tire widthwise direction, is used. Then, a tire is fitted and measured in a state in which the rim assembly is assembled as an upper rim and a lower rim.

Tires to be measured have different diameters and widths depending on their kinds. Accordingly, the testing rim assemblies are also exchanged depending on the tires subjected to the testing based on their bead diameters or bead widths (for example, see Patent Literature 1).

Here, as a plurality of rim assemblies are set to a rim exchange apparatus and the rim assemblies are also automatically exchanged according to the kinds of tires, a test time can be reduced. However, identification of the size and kind of the rim assembly placed on a specific table of the rim exchange apparatus depends on an operator of the rim exchange apparatus.

Here, as a device configured to identify the rim or the tire, it is known that an electronic label such as a transponder, a ROM or RAM type memory device, or the like is installed on the rim or the tire to identify the rim or the tire (see Patent Literature 2).

CITATION LIST

Patent Literature

[Patent Literature 1] Japanese Unexamined Patent Application, First Publication No. 2011-174839
[Patent Literature 2] Published Japanese Translation No. 2004-504977 of the PCT International Publication

SUMMARY OF INVENTION

Technical Problem

In the rim exchange apparatus, the rim assemblies having a plurality of different dimensions are placed on a turntable. Then, as the turntable is rotated, the rim assembly corresponding to the tire to be measured is selected. In this case, in order to provide an identification system that requires a wiring structure such as the electronic label on the turntable, it is necessary for the wirings to be dragged around allowing the turntable to be rotated, or for the rotation of the turntable to be restricted to an extent without interfering to the wiring. For this reason, in practice, it is difficult to install an identification system requiring the wiring structure on the turntable. In addition, the rim assemblies on the turntable may be identified from the outside of a rotation range of the turntable. However, when the identification device is installed at a side of the turntable, it interferes with a unit configured to convey the rim or another apparatus.

The present invention provides a rim exchange apparatus of a tire testing machine having a simple structure and no need of a large installation space. The rim exchange apparatus can identify the plurality of rim assemblies on the turntable and rotate the turntable with no interference.

Solution to Problem

A rim exchange apparatus of a tire testing machine according to an aspect of the present invention (hereinafter referred to as a rim exchange apparatus of a tire testing machine of the present invention or a rim exchange apparatus of the present invention) will be described below.

(1) A rim exchange apparatus of a tire testing machine including: a support part; a turntable installed to be rotated about a rotary shaft with respect to the support part; a plurality of rim placing parts provided to the turntable about the rotary shaft and on which a rim assembly is placed; and a reading part attached to the support part at a lower side of the turntable, wherein the reading part is configured to read rim identification information of a rim assembly placed on the rim placing part at a predetermined reading position through the turntable.

According to the rim exchange apparatus of the tire testing machine according to the aspect of the present invention described in (1), the turntable is installed to be rotated about the rotary shaft with respect to the support part, the plurality of rim placing parts on which the rim assembly is placed are provided to the turntable about the rotary shaft, and the reading parts are attached to the support part at a lower side of the turntable. Then, the reading parts read rim identification information of the rim assembly placed on the rim placing part through the turntable at a predetermined reading position. Accordingly, the identification information of the rim assembly can be appropriately read with no physical interference with rotation of the turntable.

(2) In the rim exchange apparatus of the tire testing machine disclosed in (1), the apparatus further includes a plurality of detection pins, which is supported by one of the turntable and the rim placing part, capable of moving upward and downward, and selectively pressed downward by a recess pattern or a protrusion pattern correspondingly formed as the rim identification information on the rim assembly placed on the rim placing part to be moved downward, wherein a plurality of reading parts is placed corresponding to each of the plurality of the detection pins, and the reading parts comprise proximity sensors that detect the detection pins moved downward.

According to the rim exchange apparatus of the tire testing machine according to the aspect of the present invention described in (2), the plurality of detection pins is supported by one of the turntable and the rim placing part, moves upward and downward, and selectively pressed downward by a recess pattern or a protrusion pattern correspondingly formed as the rim identification information on the rim assembly placed on the rim placing part to be moved downward. In addition, the reading parts correspondingly placed corresponding to each of the plurality of detection pins has a plurality of proximity sensors detecting the detection pin moved downward. Accordingly, the proximity sensors can read the kind of the rim identification by detecting lower ends of the detection pins.

(3) In the rim exchange apparatus of the tire testing machine described in (2), the apparatus includes pressing devices configured to press the detection pins upward.

According to the rim exchange apparatus of the present invention described in (3), the lower ends cannot be detected erroneously.

Accordingly, even when the electrical proximity sensors are disposed at a lower side of the turntable, which does not interfere with rotation of the turntable, the rim identification information can be obtained by only a mechanical mechanism that does not require an electrical wiring on the turntable and the rim assembly.

(4) In the rim exchange apparatus of the tire testing machine described in (1), the apparatus includes: a plurality of through-holes formed in the turntable and the rim placing part; and a plurality of proximity sensors detecting a recess pattern or a protrusion pattern correspondingly formed on the rim assembly placed on the rim placing part as the rim identification information through the plurality of through-holes.

According to the rim exchange apparatus of the tire testing machine of the aspect of the present invention described in (4), the plurality of through-holes are formed in the turntable and the rim placing part, and the plurality of proximity sensors detecting a recess pattern or a protrusion pattern correspondingly formed on the rim assembly placed on the rim placing part as the rim identification information through the plurality of the through-holes.

Accordingly, even when the electrical proximity sensors are disposed at a lower side of the turntable, which does not interfere with rotation of the turntable, the rim identification information can be obtained by only the through-hole that does not require an electrical wiring on the turntable and the rim assembly.

(5) In the rim exchange apparatus of the tire testing machine described in (1), the apparatus includes a through-hole formed in the turntable and the rim placing part; and a bar code reader, which is installed to the rim assembly facing to the through-holes, and reads bar code information printed corresponding to a kind of the rim assembly as the rim identification information through the through-hole.

According to the rim exchange apparatus of the tire testing machine of the aspect of the present invention described in (5), the through-holes is formed in the turntable and the rim placing part, and the bar code information formed on the rim assembly printed opposite to the through-hole, the rim identification information according to a kind of the rim assembly is read by the bar code reader through the through-hole.

Accordingly, even when the electrical bar code reader is disposed at a lower side of the turntable, which does not interfere with rotation of the turntable, the rim identification information can be obtained by only the bar code information that does not require an electrical wiring on the turntable and the rim assembly.

Advantageous Effects of Invention

The rim exchange apparatus of the tire testing machine of the present invention has a simple structure and does not require a large installation space. The rim exchange apparatus can identify the plurality of rim assemblies on the turntable and rotate with no interference with the turntable.

DESCRIPTION OF EMBODIMENTS

Next, a rim exchange apparatus of a tire testing machine according to an embodiment of the present invention will be described with reference to the accompanying drawings. The embodiment described below is a preferred specific example of the rim exchange apparatus of the tire testing machine of the present invention. Thus, the present embodiment may include technically preferred limitations. However, the scope of the present invention is not particularly limited the embodiment unless the context clearly indicates otherwise. Further, components in the embodiment described below may be appropriately substituted with known components and various variations including combinations with the other known components may be made. Accordingly, a description of the following embodiment does not limit the scope of the present invention according to the accompanying claims.

Figure 1:
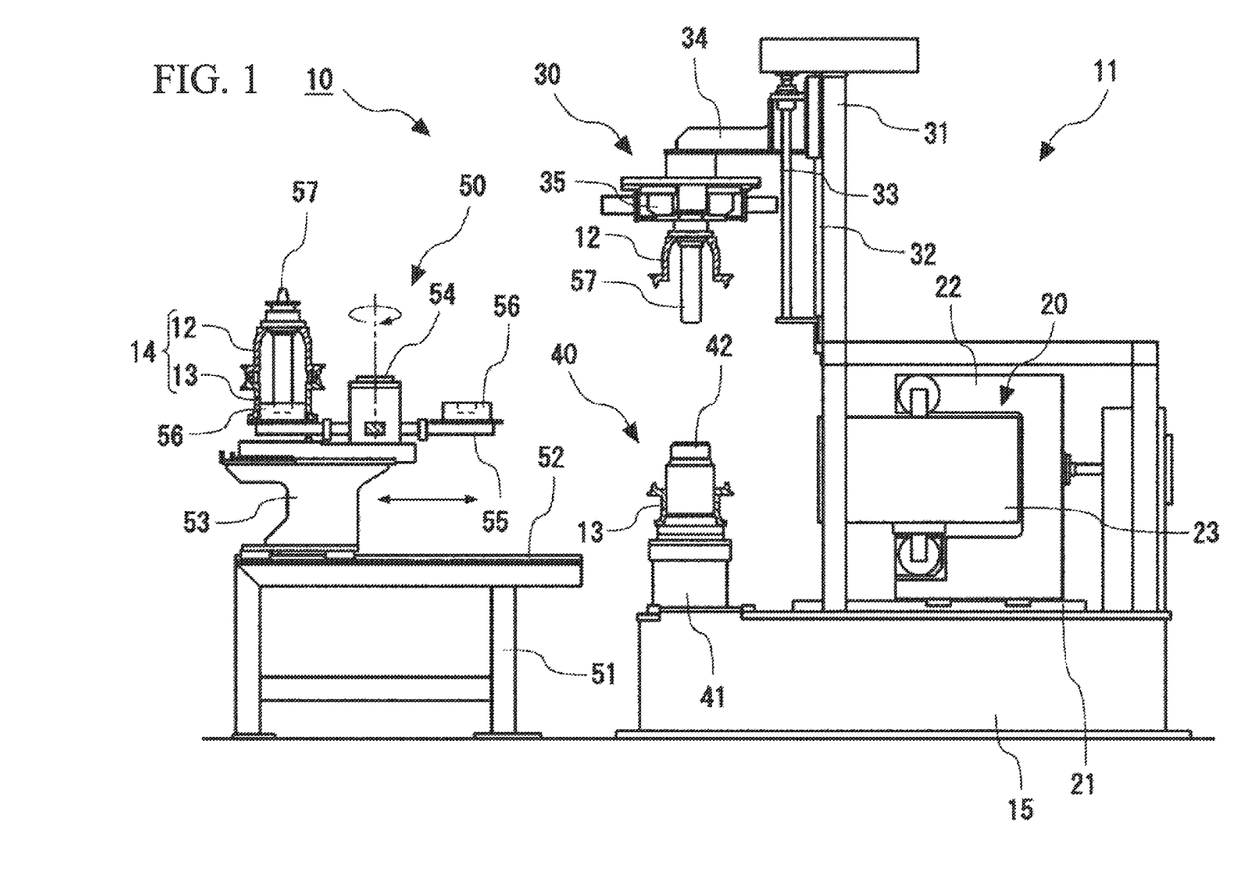
FIG. 1 is a front view of a tire testing machine on which a rim exchange apparatus is mounted according to an embodiment of the present invention.
Figure 2:
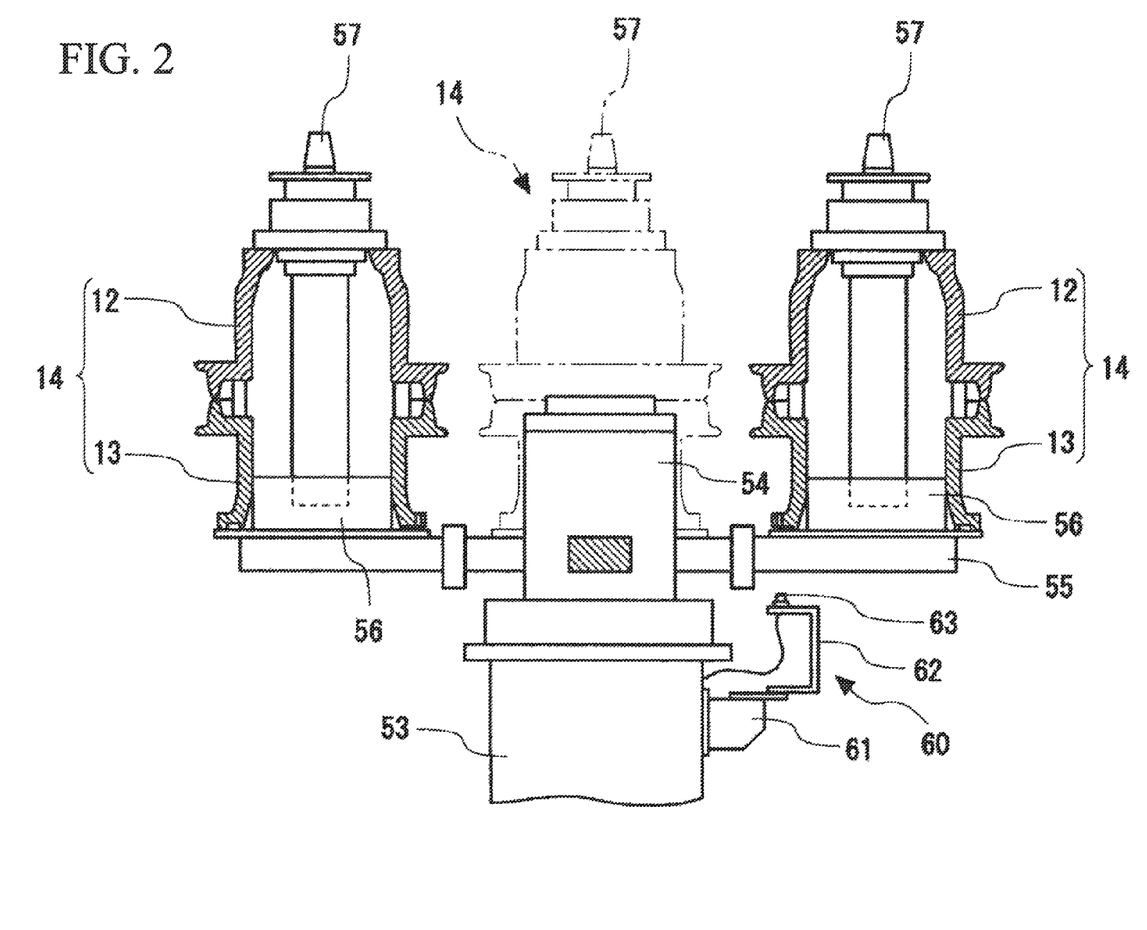
FIG. 2 is a side view of a major part of the rim exchange apparatus of the embodiment of the present invention.
Figure 3:
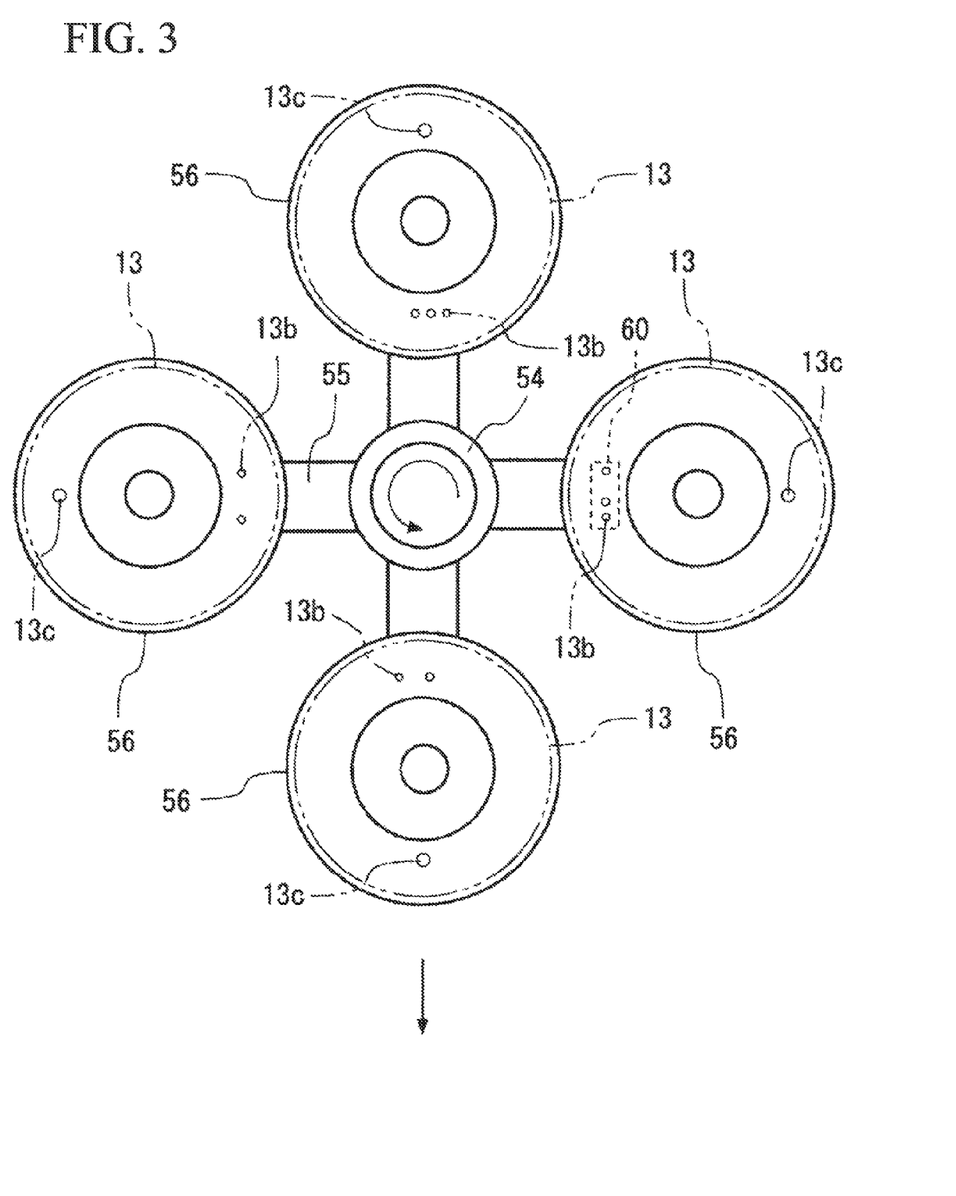
FIG. 3 is a plan view of the major part of the rim exchange apparatus of the embodiment of the present invention.
Figure 4A:
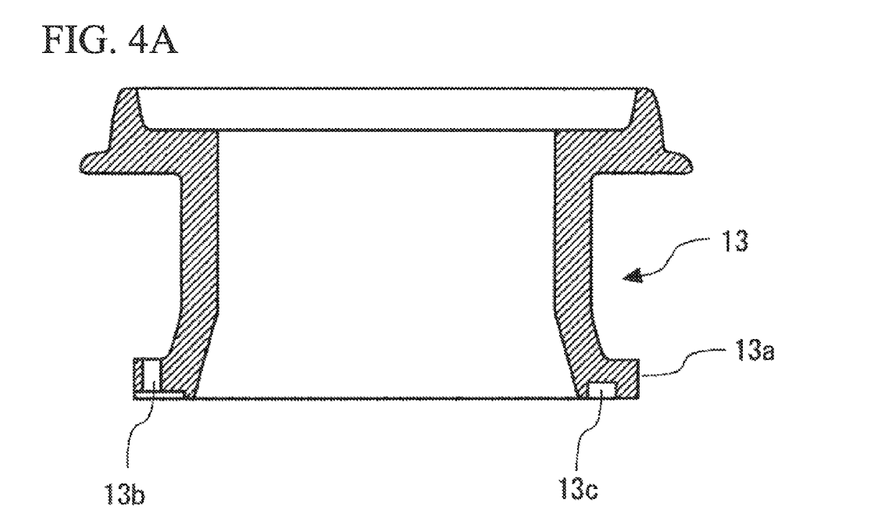
FIG. 4A shows a rim assembly applied to the rim exchange apparatus of the embodiment of the present invention, showing a cross-sectional view of a lower rim taken along line A-A of FIG. 4B.
Figure 4B:
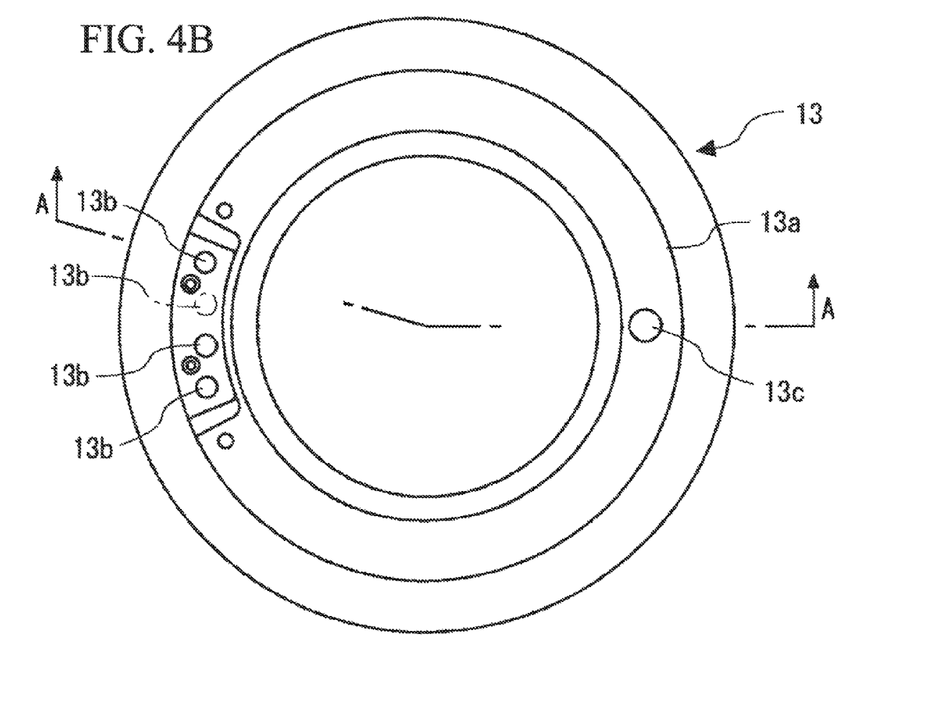
FIG. 4B shows the rim assembly applied to the rim exchange apparatus of the embodiment of the present invention, showing a bottom view of the lower rim.
Figure 5:
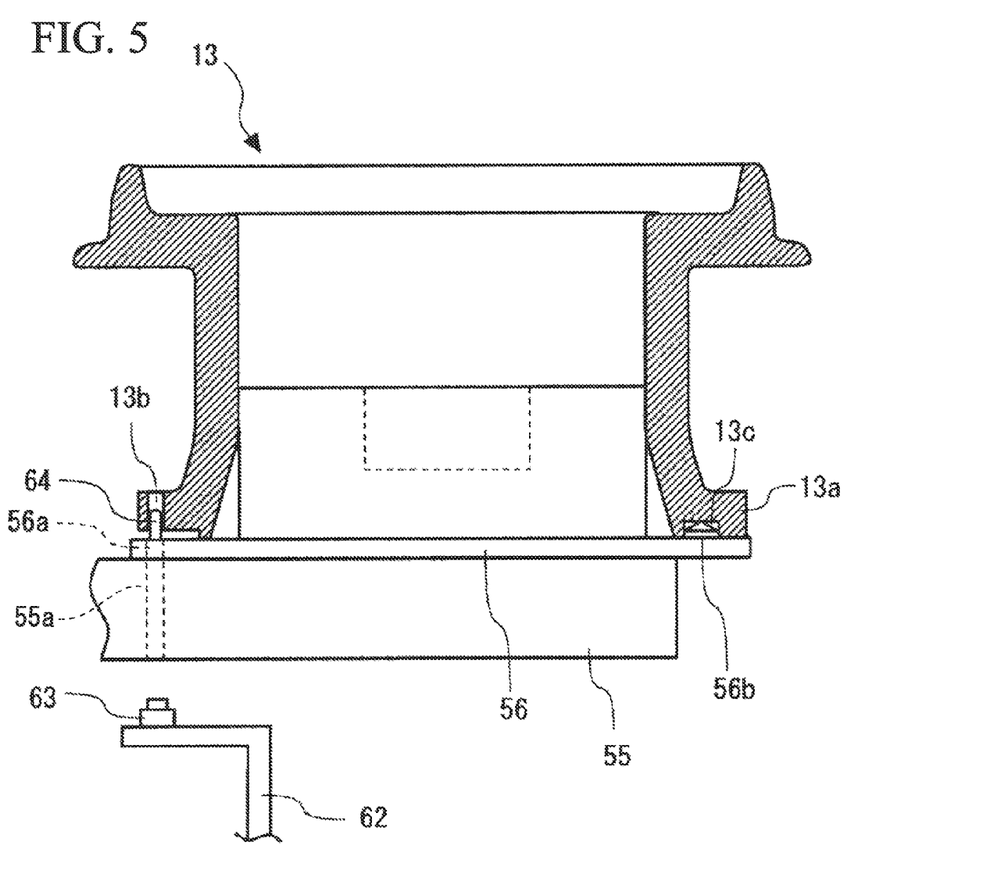
FIG. 5 is a view for describing the major part of the rim exchange apparatus of the embodiment of the present invention.
Figure 6:
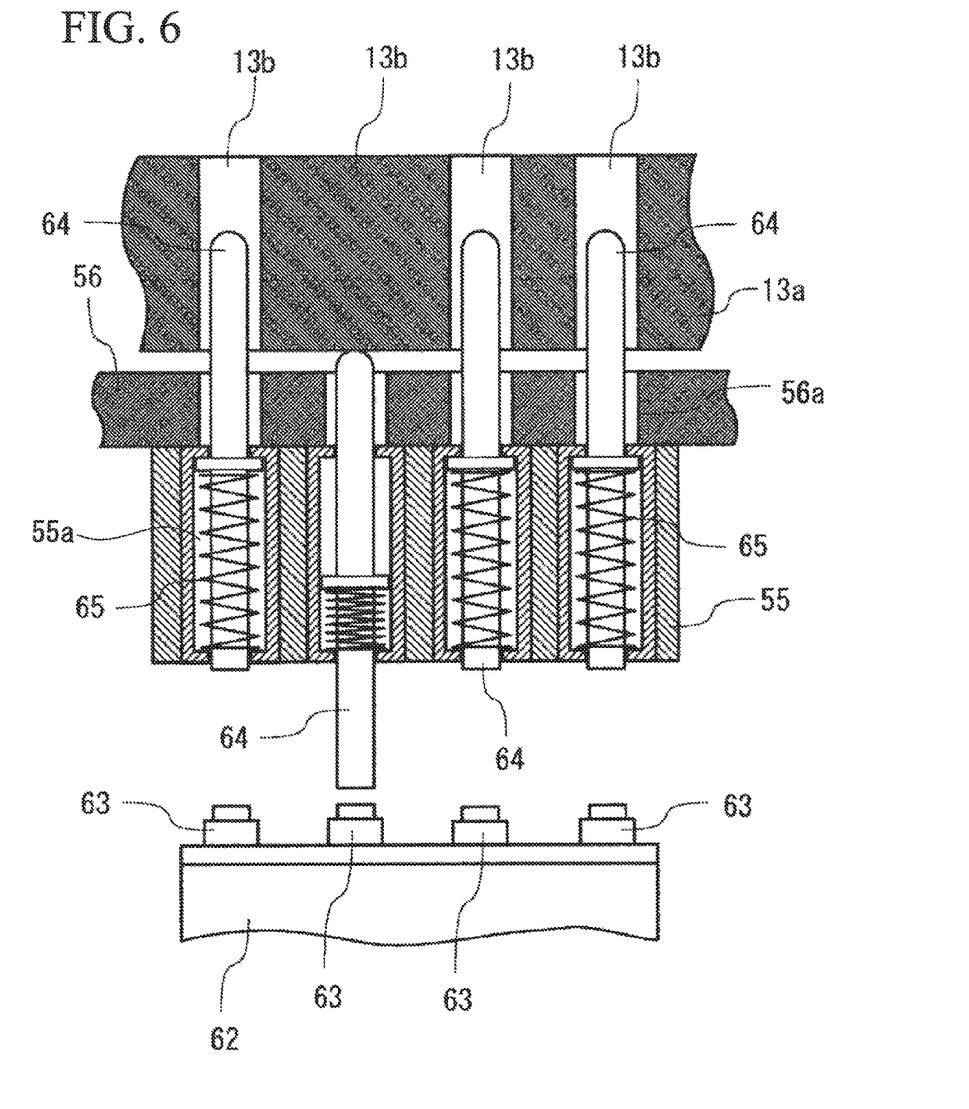
FIG. 6 is a cross-sectional view of the major part of the rim exchange apparatus of the embodiment of the present invention.
Figure 7:
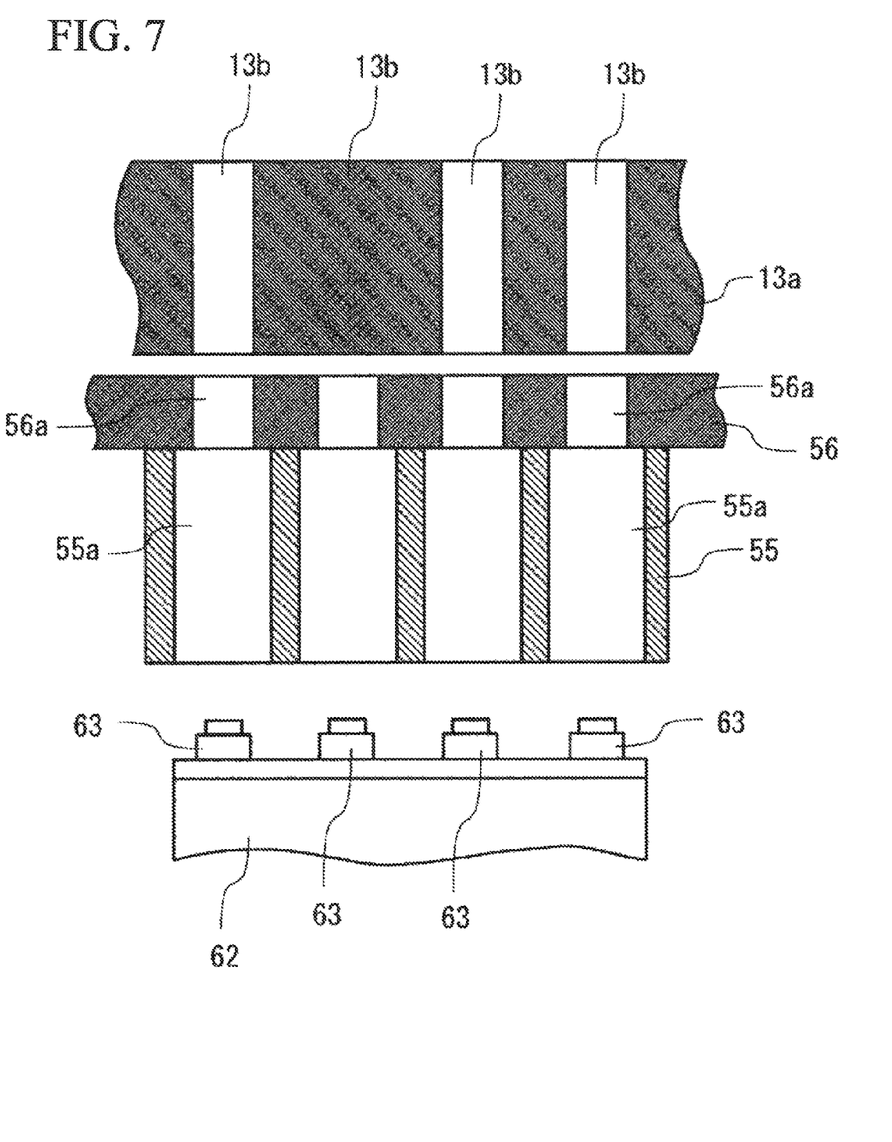
FIG. 7 is a cross-sectional view of a major part of modified Example 1 of the rim exchange apparatus of the embodiment of the present invention.
Figure 8:
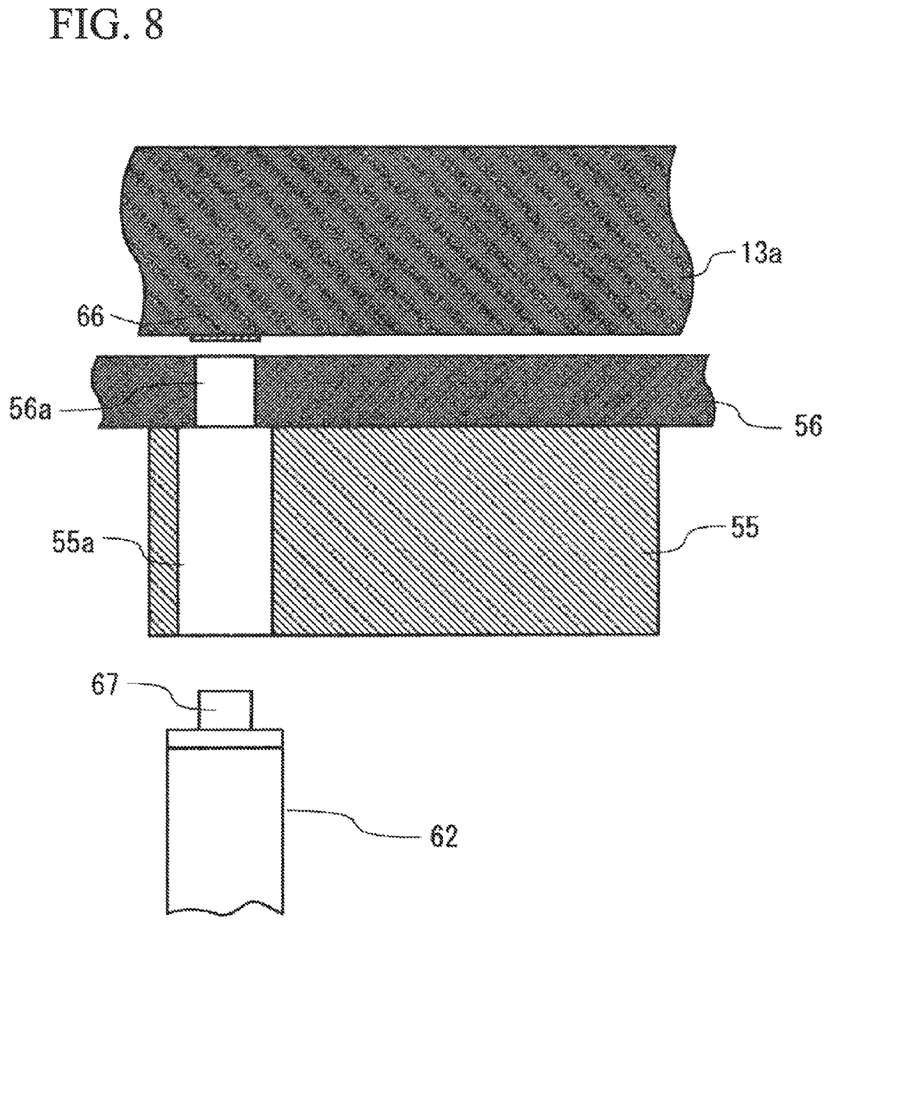
FIG. 8 is a cross-sectional view of a major part of modified Example 2 of the rim exchange apparatus of the embodiment of the present invention.

FIG. 1 is a front view of a tire testing machine on which a rim exchange apparatus is mounted according to an embodiment of the present invention. FIG. 2 shows a rim assembly applied to the rim exchange apparatus of the embodiment of the present invention. FIG. 2 is a side view of a major part of the rim exchange apparatus of the embodiment of the present invention. FIG. 3 is a plan view of the major part of the rim exchange apparatus of the embodiment of the present invention. FIG. 4A is a cross-sectional view of a lower rim taken along line A-A of FIG. 4B. FIG. 4B is a bottom view of the lower rim. FIG. 5 is a view for describing the major part of the rim exchange apparatus of the embodiment of the present invention. FIG. 6 is a cross-sectional view of the major part of the rim exchange apparatus of the embodiment of the present invention. FIG. 7 is a cross-sectional view of a major part of modified Example 1 of the rim exchange apparatus of the embodiment of the present invention. FIG. 8 is a cross-sectional view of a major part of modified Example 2 of the rim exchange apparatus of the embodiment of the present invention.

In FIG. 1, a tire testing machine 10 includes a tire uniformity measuring apparatus 11 measuring uniformity of a tire, and a rim exchange apparatus 50 configured to exchange a rim assembly 14 with a new one by assembling an upper rim 12 and a lower rim 13 with respect to the tire uniformity measuring apparatus 11. In addition, the tire uniformity measuring apparatus 11 may be a tire balance measuring apparatus measuring the balance of tires.

The tire uniformity measuring apparatus 11 includes a base frame 15, a measurement unit 20 installed at the base frame 15, an upper rim support part 30 installed at the base frame 15, and a lower rim support part 40 installed at the base frame 15.

The measurement unit 20 includes a guide rail 21 constructed on the base frame 15, a wheel support part 22 installed at the guide rail 21, a cylindrical load wheel 23 rotatably installed at the wheel support part 22, and a moving apparatus 24 configured to move the wheel support part 22 along the guide rail 21.

The upper rim support part 30 includes a frame 31 standing up from the base frame 15, an elevation rail 32 fixed to the frame 31, a ball screw 33 supported by the frame 31 and parallel to the elevation rail 32, an upper rim elevator 34 supported by the elevation rail 32 and driven by the ball screw 33 to be driven back and forth, and an upper rim chuck 35 installed at the upper rim elevator 34.

The lower rim support part 40 includes a rotary base 41 installed at the base frame 15 and a lower rim spindle 42 installed at the rotary base 41.

The rim exchange apparatus 50 includes a base frame 51, a guide rail 52 constructed on the base frame 51, a support part 53 guided by the guide rail 52, a pivot shaft 54 installed at the support part 53 as shown in FIG. 2, a turntable 55 having a cross shape when seen in a plan view and a base end supported by the pivot shaft 54 to be rotated about the pivot shaft 54 as a rotary shaft as shown in FIG. 3, a plurality of rim placing parts 56 installed at the respective tip sides of the turntable 55 and on which the rim assembly 14 is disposed, an upper rim holder 57 supported by the rim placing part 56 that supports the lower rim 13 in a state in which the lower rim 13 is positioned, and a reading part 60 attached to the support part 53 under the turntable 55 as shown in FIG. 2.

The support part 53 is slidably displaced (back and forth) on the base frame 51 along the guide rail 52 to move closer to or to move away from the tire uniformity measuring apparatus 11. The rim assembly 14 is exchanged with a new one when the support part 53 moves closer to the tire uniformity measuring apparatus 11. In a state in which the rim assembly 14 is not set onto the tire uniformity measuring apparatus 11, when the support part 53 moves closer to the tire uniformity measuring apparatus 11, an elevator 34 is lowered and the upper rim chuck 35 chucks (grabs) the upper rim holder 57. Then, as shown in FIG. 1, the elevator 34 is raised once, and the upper rim 12 and the lower rim 13 are separated from each other. After that, as the elevator 34 is lowered in a state in which a tire to be tested (not shown) is interposed therebetween, the tire can be fitted into the rim assembly 14.

Meanwhile, in the embodiment, as shown in FIGS. 4A and 4B, a flange section 13a of the lower rim 13 has rim identification information parts 13b constituted by through-holes formed in a combination according to the kind of the rim assembly 14. It also has a positioning recess part 13c formed at a position opposite to the rim identification information part 13b across the center of the rim. In the embodiment, the rim identification information parts 13b are disposed in four places. The rim identification information parts 13b disposed at four places are held in a state in which the through-holes having a specific hole diameter are formed or a state in which the through-holes are not formed. In the rim identification information parts 13b disposed at four places, 4-bit information can be applied to the rim assembly 14 by combination patterns in which the through-holes are formed or not formed. In other words, the rim assembly 14 having the four rim identification sections 13b can provide sixteen patterns in which the through-holes are formed or not formed. In addition, in the present invention, non-formation of the through-hole of the rim identification information part 13b may be a state in which the through-hole is not formed or the through-hole is filled after formation (regardless of a material). In the following description, a combination including the state in which the through-holes are not formed will be described.

As shown in FIGS. 2 and 5, the reading part 60 includes four proximity sensors 63 installed at the support part 53 via brackets 61 and stays 62. In addition, in the embodiment, the reading part 60 is disposed at one place of the turntable 55, which is a predetermined reading position.

The proximity sensor 63 is disposed to face the rim identification information part 13b of the lower rim 13 supported in a state positioned at the rim placing part 56. Here, the rim placing part 56 includes a through-hole 56a facing the rim identification information part 13b and a positioning protrusion part 56b configured to engage with the positioning recess part 13c to position the lower rim 13.

In addition, the turntable 55 has a turntable through-hole 55a in communication with the through-hole 56a of the rim placing part 56 and passing from an upper surface to a lower surface of the turntable.

As shown in FIG. 6, the turntable 55 includes a plurality of detection pins 64 configured to pass through the through-holes 56a of the rim placing part 56 such that an upper end can protrude from the upper surface and a lower end can protrude from the bottom surface of the turntable 55, and a spring 65, which is a pressing device, pressing the detection pin 64 in a tip protruding direction.

In the above-mentioned configuration, when the rim assembly 14 is set to the rim placing part 56, the upper end of the detection pin 64 is accommodated in and protrudes from a portion of the through-hole of the rim assembly 14, which is opened downward, at a position at which the through-hole is formed as the rim identification information part 13b.

Meanwhile, the upper end of the detection pin 64 is pressed down by the weight of the rim assembly 14 at a place at which the through-hole is not formed as the rim identification information part 13b, and the detection pin 64 is pressed downward against a biasing force of the spring 65. An amount of downward pressing of the lower end of the detection pin 64 is varied according to formation or non-formation of the through-hole of the rim identification information part 13b opposite thereto.

The proximity sensor 63 detects the detection pin 64 having the upper end pressed against the bottom surface of the lower rim 13 (a bottom surface of the flange section 13a) and the lower end advanced to a lower side of the turntable 55 by setting its sensitivity to an extra-close-range detection mode.

Accordingly, for example, the detected information of the proximity sensor 63 is input into a control circuit (not shown) installed at the support part 53 and configured to control slide of the support part 53 and rotation of the pivot shaft 54. The control circuit specifies the kind of the rim assembly 14 by combining the detected information of the proximity sensor 63 based on preset table information. In addition, the specified information is used upon a tire test by combining with tire selection information, and a rotating position of the turntable 55 is controlled.

According to the rim exchange apparatus of the tire testing machine of the embodiment, the turntable 55 is installed to be rotated about a rotary shaft with respect to the support part 53, the plurality of rim placing parts 56 at which the rim assembly 14 is disposed are installed at the turntable 55 about the rotary shaft, and the reading part 60 is attached to the support part 53 at a lower side of the turntable 55. Then, the reading part 60 reads rim identification information of the rim assembly 14 placed on the rim placing part 56 through the turntable 55 at a predetermined reading position. Accordingly, the identification information of the rim assembly 14 can be read well without interference with rotation of the turntable 55.

Specifically, the rim exchange apparatus of the tire testing machine of the embodiment includes the detection pin 64, which is supported by the turntable 55, capable of moving upward and downward, and capable of being moved downward by being pressed selectively according to formation or non-formation of the through-hole formed as the rim identification information corresponding to the rim assembly 14 placed on the rim placing part 56. Also it includes a plurality of proximity sensors 63 correspondingly disposed at the plurality of detection pins 64 to detect the detection pin 64 pressed downward. Then, a formation or non-formation pattern of the through-holes formed in the rim assembly 14 is read from a detection or non-detection pattern of the lower ends of the detection pins 64 by the plurality of proximity sensors 63. As a result, the kind of the rim assembly 14 is specified.

Accordingly, even when the electrical proximity sensor 63 is disposed under the turntable 55, which does not interfere with rotation of the turntable 55, the identification information can be obtained by only a mechanical mechanism, which does not require an electrical wiring, at the turntable 55 and the rim assembly 14.

In addition, in the embodiment, while the formation or non-formation pattern of the through-holes is formed at the rim assembly 14 as the rim identification information according to the detection pin 64, an aspect of the present invention is not limited thereto. For example, the rim identification information does not have to be formed by the through-holes as long as the patterns of the formed-recess part or unformed-recess part, such as the opening parts of the through-holes capable of accommodating the detection pin 64 without pressing it, are formed. It is acceptable if it is a combination of the formed and unformed recess parts capable of accommodating the upper end of the detection pin 64 at least.

Further, a pattern in which a protrusion part instead of the recess part is formed or not formed may be used. In this case, the detection pin 64 moves downward by a protrusion amount of the protrusion part at a portion at which the protrusion part is formed, and the movement of the detection pin 64 may be detected by the proximity sensor 63 constituting the reading part 60.

In addition, while the rim identification information part is formed at one place of the rim assembly 14, it is not limited thereto but may be formed in a plurality of places and selectively used.

Furthermore, while the detection pin 64 having the upper end and the lower end protrudes upward or downward, it is not limited thereto. The upper end need not protrude upward as long as the detection pin 64 is selectively pressed according to the rim identification information of the rim assembly, and further, the lower end need not protrude downward as long as the reading part 60 can detect that the detection pin 64 is selectively pressed to move downward.

In addition, the proximity sensor 63 is not limited to a non-contact sensor detecting an approach within a predetermined distance but may be a contact type sensor. Further, in the embodiment, while the reading part 60 is installed at one place of the turntable 55, which is a predetermined reading position, it is not limited thereto but may be installed in a plurality of places, each of which is a reading position, to read the rim identification information.

In addition, in the embodiment, while it has been described that the detection pin 64 is used, for example, as shown in FIG. 7, through-holes 55*a* and 56*a* may be formed to bring both of the turntable 55 and the rim placing part 56 in communication with each other and the rim identification information parts 13*b* may be directly detected (the bottom surface of the rim placing part 56 is detected) by sensors that can detect the rim identification information parts 13*b* through the through-holes 55*a* and 56*a*, for example, an optical sensor such as a photoelectric sensor, a sensor using an ultrasonic wave, or the like.

According to the above-mentioned configuration, even when the electric proximity sensor 63 is disposed under the turntable 55, which does not interfere with rotation of the turntable 55, the identification information can be obtained through only the through-holes 55*a* and 56*a*, which are simple configurations, without the requirement of an electrical wiring on the turntable 55 and the rim assembly 14.

Even in the above-mentioned configuration, the rim identification information part is not limited to be the through-hole, as long as it is formed in a recessed form and undetected by the proximity sensor 63. Alternatively, it is acceptable that it is formed in a protruded form or non-protruded form and only the protruded form is detected by the proximity sensor 63.

Further, the reading part and the rim identification information part can be configured as shown in FIG. 8 can be, for example. In the configuration, the through-holes 55*a* and 56*a* are formed in the turntable 55 and the rim placing part 56 in a straight line, respectively. The rim identification information part is the bar code label 66, which is provided on the bottom surface of the rim assembly 14 opposite to the through-holes 55*a* and 56*a*, and on which a bar code according to the kind of the rim is printed. The bar code information is read with the bar code reader 67.

According to the above-mentioned configuration, even when the electric bar code reader 67 is disposed under the turntable 55, which does not interfere with rotation of the turntable 55, the identification information can be obtained by only the bar code information, which is a simple configuration, without necessity of an electrical wiring on the turntable 55 and the rim assembly 14.

INDUSTRIAL APPLICABILITY

The kind of the rim assembly placed on the table of the rim exchange apparatus can be automatically identified with a compact and simple apparatus, and tire testing can be performed more efficiently.

REFERENCE SIGNS LIST

10: Tire testing machine
11: Tire uniformity measuring apparatus
12: Upper rim
13: Lower rim
13*b*: Rim identification information part
14: Rim assembly
50: Rim exchange apparatus
51: Base frame
53: Support part
54: Pivot shaft
55: Turntable
56: Rim placing part
60: Reading part
63: Proximity sensor
64: Detection pin

The invention claimed is:

1. A rim exchange apparatus of a tire testing machine comprising:
   a support part;
   a turntable installed to be rotated about a rotary shaft with respect to the support part;
   a plurality of rim placing parts provided to the turntable about the rotary shaft and on which a rim assembly is placed;
   a reading part attached to the support part at a lower side of the turntable;
   a plurality of detection pins, which is supported by the turntable, capable of moving upward and downward, and selectively pressed downward by a recess pattern or a protrusion pattern correspondingly formed as a rim identification information on the rim assembly placed on the rim placing part to be moved downward;
   pressing devices configured to press the detection pins upward, the pressing devices being located around an outer periphery of the detection pins and located in the turntable; and
   a plurality of through-holes formed in the turntable and the rim placing part,
   wherein:
   the reading part is configured to read the rim identification information of a rim assembly placed on the rim placing part at a predetermined reading position through the turntable,
   the plurality of reading parts are placed corresponding to each of the plurality of the detection pins, and the reading parts comprise non-contact proximity sensors that detect the detection pins moved downward,
   an upper end of the detection pin is accommodated in and protrudes from a portion of the recess pattern of the rim assembly at a position at which the recess pattern is formed as the rim identification information,
   the upper end of the detection pin is pressed down by a weight of the rim assembly at a position at which the protrusion pattern is formed as the rim identification information, and
   the detection pin is pressed downward against a biasing force of the pressing devices.

2. The rim exchange apparatus of the tire testing machine according to claim 1, further comprising
   a plurality of proximity sensors detecting a recess pattern or a protrusion pattern correspondingly formed on the rim assembly placed on the rim placing part as the rim identification information through the plurality of through-holes.

3. The rim exchange apparatus of the tire testing machine according to claim 1, further comprising:
   a through-hole formed in the turntable and the rim placing part; and
   a bar code reader, which is installed to the rim assembly facing to the through-holes, and reads bar code information printed corresponding to a kind of the rim assembly as the rim identification information through the through-hole.

* * * * *